(12) United States Patent  
Vilendre et al.

(10) Patent No.: US 8,671,970 B2  
(45) Date of Patent: Mar. 18, 2014

(54) FLOW-THROUGH TRAP PRIMER VALVE ASSEMBLY

(71) Applicant: JL Idustries, Inc., Portland, OR (US)

(72) Inventors: Jack S. Vilendre, West Linn, OR (US); M. Kevin Hardwick, North Plains, OR (US)

(73) Assignee: JL Industries, Inc., Portland, OR (US)

( * ) Notice: Subject to any disclaimer, the term of this patent is extended or adjusted under 35 U.S.C. 154(b) by 0 days.

(21) Appl. No.: 14/065,094

(22) Filed: Oct. 28, 2013

(65) Prior Publication Data

US 2014/0048150 A1    Feb. 20, 2014

Related U.S. Application Data

(63) Continuation of application No. 13/341,233, filed on Dec. 30, 2011, now abandoned.

(60) Provisional application No. 61/428,704, filed on Dec. 30, 2010.

(51) Int. Cl.  
*G05D 16/10* (2006.01)

(52) U.S. Cl.  
USPC ............ 137/118.05; 137/118.02; 137/118.06; 137/119.03; 137/247.25; 137/881

(58) Field of Classification Search  
USPC ............ 137/118.01, 118.02, 118.04, 118.05, 137/118.06, 119.03, 247.25, 881  
See application file for complete search history.

(56) References Cited

U.S. PATENT DOCUMENTS

| | | | | |
|---|---|---|---|---|
| 1,759,826 A * | 5/1930 | Goss | | 137/118.02 |
| 1,967,643 A * | 7/1934 | Williams | | 137/118.05 |
| 1,967,644 A * | 7/1934 | Williams | | 137/118.02 |
| 1,970,744 A * | 8/1934 | Goss | | 137/118.05 |
| 2,126,140 A * | 8/1938 | Ross | | 137/118.05 |
| 2,154,659 A * | 4/1939 | Boydston | | 137/118.05 |
| 2,154,811 A * | 4/1939 | Goss | | 137/118.05 |
| 2,157,545 A * | 5/1939 | Klosterman | | 137/118.05 |
| 2,162,236 A * | 6/1939 | Williams | | 137/118.05 |
| 2,169,541 A * | 8/1939 | Smith | | 137/118.05 |
| 2,496,465 A * | 2/1950 | Goss | | 137/118.05 |
| 3,134,392 A * | 5/1964 | Goss | | 137/118.05 |
| 3,146,787 A * | 9/1964 | Kupfer, Jr. | | 137/118.05 |
| 4,000,752 A * | 1/1977 | Miller et al. | | 137/118.05 |
| 4,497,337 A * | 2/1985 | Mosbrucker et al. | | 137/247.25 |
| 5,263,508 A * | 11/1993 | Perrott | | 137/247.25 |
| 5,560,548 A * | 10/1996 | Mueller et al. | | 239/442 |
| 6,422,260 B2 * | 7/2002 | Danowski et al. | | 137/118.05 |
| 6,704,946 B1 * | 3/2004 | Mueller et al. | | 4/420.4 |
| 7,213,616 B2 * | 5/2007 | Wuollet et al. | | 137/625.48 |
| 2008/0128028 A1 * | 6/2008 | Weltman | | 137/118.05 |

* cited by examiner

*Primary Examiner* — John K Fristoe, Jr.  
*Assistant Examiner* — Minh Le  
(74) *Attorney, Agent, or Firm* — Kolisch Hartwell, PC

(57) ABSTRACT

A flow meter trap primer valve assembly for regulating flow includes an inlet for receiving water from a supply, a check valve mounted within an adaptor having an elongate bore forming a jet, and the check valve includes a piston mounted within a cartridge. A biasing element normally urges the piston against a trap seat.

4 Claims, 4 Drawing Sheets

FLOW-THROUGH TRAP PRIMER VALVE ASSEMBLY

CROSS-REFERENCE TO RELATED APPLICATIONS

This application is a continuation of U.S. patent application Ser. No. 13/341,233, filed Dec. 30, 2011 and entitled FLOW-THROUGH TRAP PRIMER VALVE ASSEMBLY, which claims priority under 35 U.S.C. §119 to U.S. Provisional Patent Application Ser. No. 61/428,704, filed Dec. 30, 2010 and entitled FLOW-THROUGH TRAP PRIMER VALVE ASSEMBLY, the complete disclosure of which is incorporated herein by reference for all purposes.

BACKGROUND AND SUMMARY OF THE INVENTION

Municipal and plumbing and sanitary codes mandate that waste water be delivered automatically to sewer line water traps, and trap primer valves have conventionally been employed to provide a fresh water barrier in the trap of a sewer line to inhibit reverse migration of odors from the sewer line to a dwelling. In that connection, the present invention relates to a trap primer valve assembly of the flow-through type which is provided with a flow regulator operable for automatically metering water to a trap. The present invention is directed to an improved flow-through trap primer valve assembly which incorporates a flow regulator operable for metering liquid from a supply, such as the water main of a building, or residence, apartment, restaurant, etc., to the trap of the building.

The flow regulator operates from an initially closed position to variable open positions actuated from the flow from the main, and includes a check valve utilizing a piston mounted inside a cartridge. The idea is that during even relatively low flow rates, for example in the range of at least about one-half gallon per minute, as when a faucet is turned on, the piston will be raised a predetermined amount, say 3/16 of an inch, to permit flow of water to a jet for dispensing the liquid to an outlet directed to the trap, thereby to replenish the trap with fresh water.

The check valve of the present invention is mounted within a cartridge which in turn is mounted in a housing, which may be constructed in the T-shaped configuration, with inlet and outlet flow-through ports, as well as a port including a jet for dispensing water to the sewer line trap. The check valve includes a piston normally biased downwardly by a spring so that the head of the piston engages and thereby seals the inlet of the jet, so that no water flows into the jet. Upon an increase in demand of water, as when a faucet is actuated, the flow engages the piston to elevate it enabling water not only to pass to the faucet, but also to permit a metered amount of water to be dispensed to the jet and downwardly to the trap.

The piston is mounted for reciprocal movement in a cartridge-like device, which includes elongate sides formed of spaced-apart, upwardly extending elements. This construction facilitates flow of water upwardly from the inlet through the spaces existing between the elements when the water flow pushes the piston upwardly. The pressure exerted by the spring against the piston may be selectively adjusted, depending upon conditions and need, by a primer cap mounted on top of the housing of the trap primer valve assembly. The primer cap can be adjusted to engage a smaller, conical cap which partially houses the spring.

As the primer cap is adjusted upwardly or downwardly, the spring will correspondingly exert more or less pressure on the piston head, thereby requiring more or less water flow to engage the piston head to lift it off and upwardly from its sealed position when it engages the opening of the jet that is directed to the trap. This adjustability feature of the present invention enables "fine tuning" to select the amount of water delivered to the jet, and ultimately, to the sewer line trap. The piston enables this fine tuning because it can readily slide upwardly and downwardly along the inner surface of the upstanding elements of the cartridge and be guided thereby.

DETAILED DESCRIPTION OF THE PREFERRED EMBODIMENT

As stated at the outset, the present invention is directed to an improved flow-through trap primer valve assembly which includes a flow regulator utilizing a check valve operable for metering liquid from a supply or a water main in a building, such as a residence, apartment, restaurant, etc., to the trap of the building. The flow regulator operates or is actuated from the flow from the main, and includes a check valve utilizing a piston mounted inside a cartridge. The idea is that during flow rates which can be even relatively low, i.e., in the range of one-half gallon per minute, as when a faucet is turned on, the piston will be raised a predetermined amount, say 3/16 of an inch, to permit flow of water to a jet for dispensing of the liquid to an outlet directed to the trap, thereby to replenish the trap with fresh water.

Figure 1:
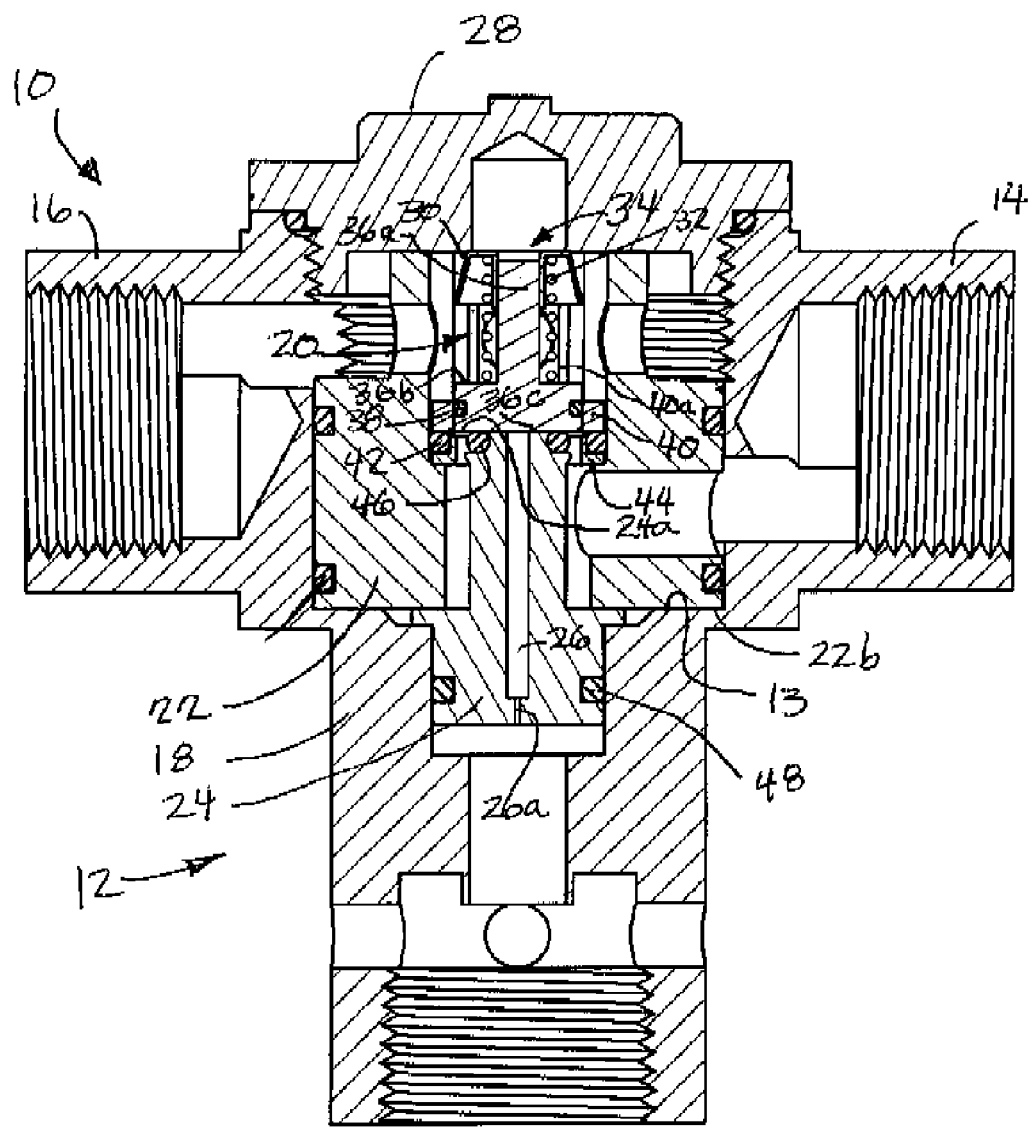
FIG. 1 is a cross-sectional view of the housing of the trap primer valve of the present invention and illustrates the check valve in its assembled configuration with the piston of the check valve engaging and sealing the inlet to the jet which leads to the trap in the sewer (not shown)

As shown in FIG. 1 of the drawings, a trap primer valve assembly in accordance with the present invention is generally indicated at 10, and may include a T-shaped housing 12, having a threaded inlet and outlet extensions, indicated at 14, 16, respectively, for connection to suitable inlet and outlet piping, respectively. The inlet is adapted for connection to the main water supply, and the outlet to the faucets, etc in the building. A bottom extension 18 is directed for connection to piping leading to the trap and the sewer system. The flow regulator includes a check valve assembly, generally indicated at 20, which is mounted within a check valve adapter 22, secured to the housing. In turn, a primer trap seat 24 is mounted within the check valve adapter, and is provided with an elongate bore forming a jet 26, extending to jet outlet 26a, which extends to the sewer and trap (not shown).

Figure 2:
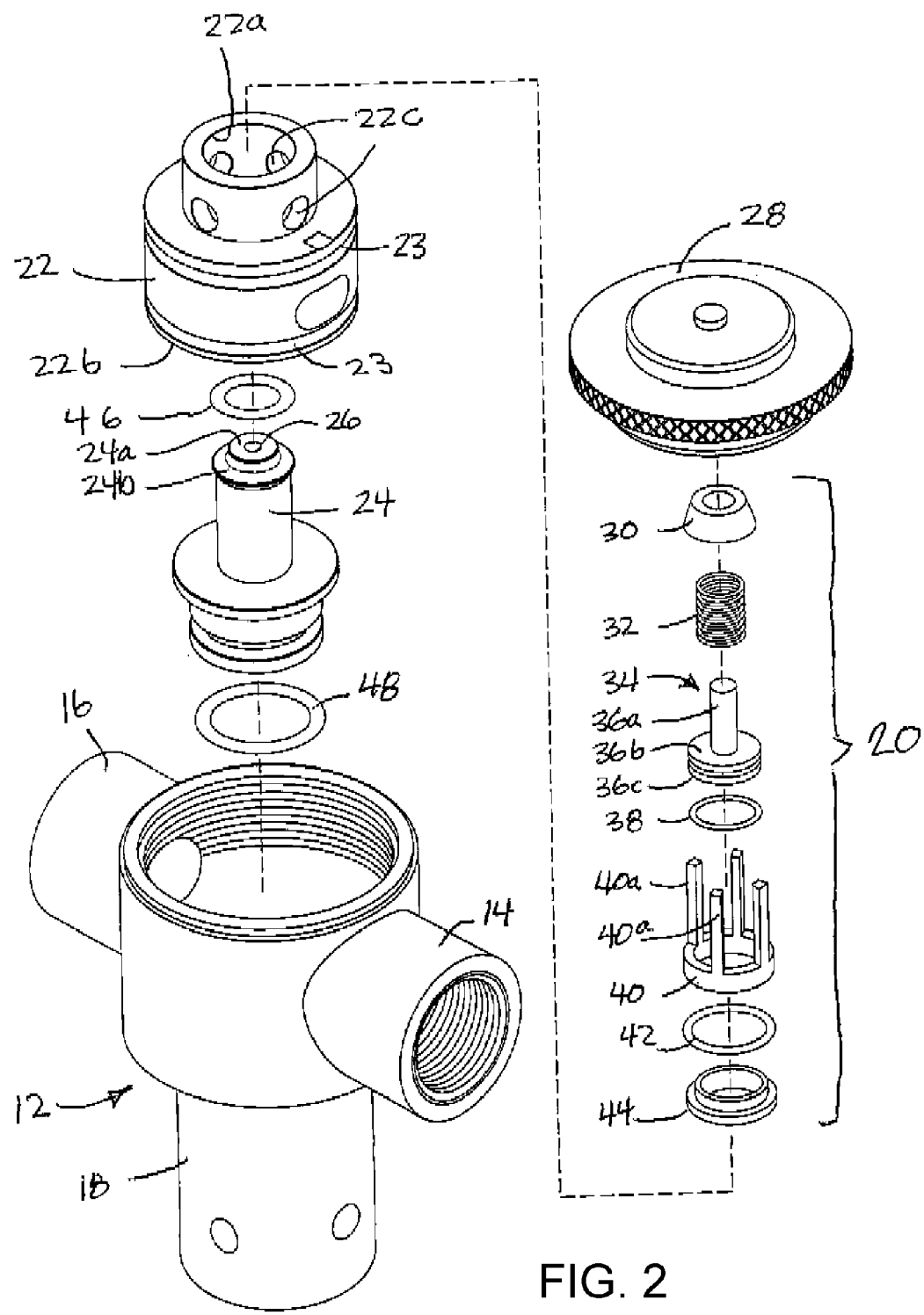
FIG. 2 is an exploded view of the components of the trap primer valve, and illustrates their positioning relative to each other with the components of the check valve being shown to the right in the view.

A primer cap 28 is suitably threadedly mounted on top of the trap primer assembly and is selectively adjustable for maintaining the check valve assembly in a normally closed or inoperable position as will be described. An exploded view of the trap primer assembly is shown in FIG. 2; specifically, primer cap 28 is shown to the right on top, and the components of check valve assembly 20 are longitudinally aligned below, arranged in the order in which they would be assembled. A conical cap 30 receives a biasing element such as a coil spring 32, and a piston, generally indicated at 34, is mounted so that its shaft 36a is axially inserted in the spring. The spring is dimensioned so that its lower end engages the top surface of piston head 36b, which includes an annular groove for receiving an O-ring 38.

The piston is slidably inserted in rim 40, from which extend radially-spaced apart, upwardly projecting elements 40a, the tops of which extend into conical cap 30. An O-ring 42 is seated against the flange of a base 44, and engages the bottom portion of rim 40. The arrangement of cap 30, rim 40, elements 40a, and base 44 may be thought of as a cartridge, holding piston 34 and associated spring 32. In FIGS. 1 and 2, it can be seen that the bottom of piston head 36b normally engages top face 24a of trap seat 24. The entirety of check valve 20 is essentially contained within bore 22a of check valve adapter 22, and this configuration is shown in the assembled configurations of FIGS. 1, 3, and 4. As also shown therein, annular bottom end 22b of check valve adapter 22 engages and is seated against an upper, annular surface 13 of housing 12.

Figure 3:
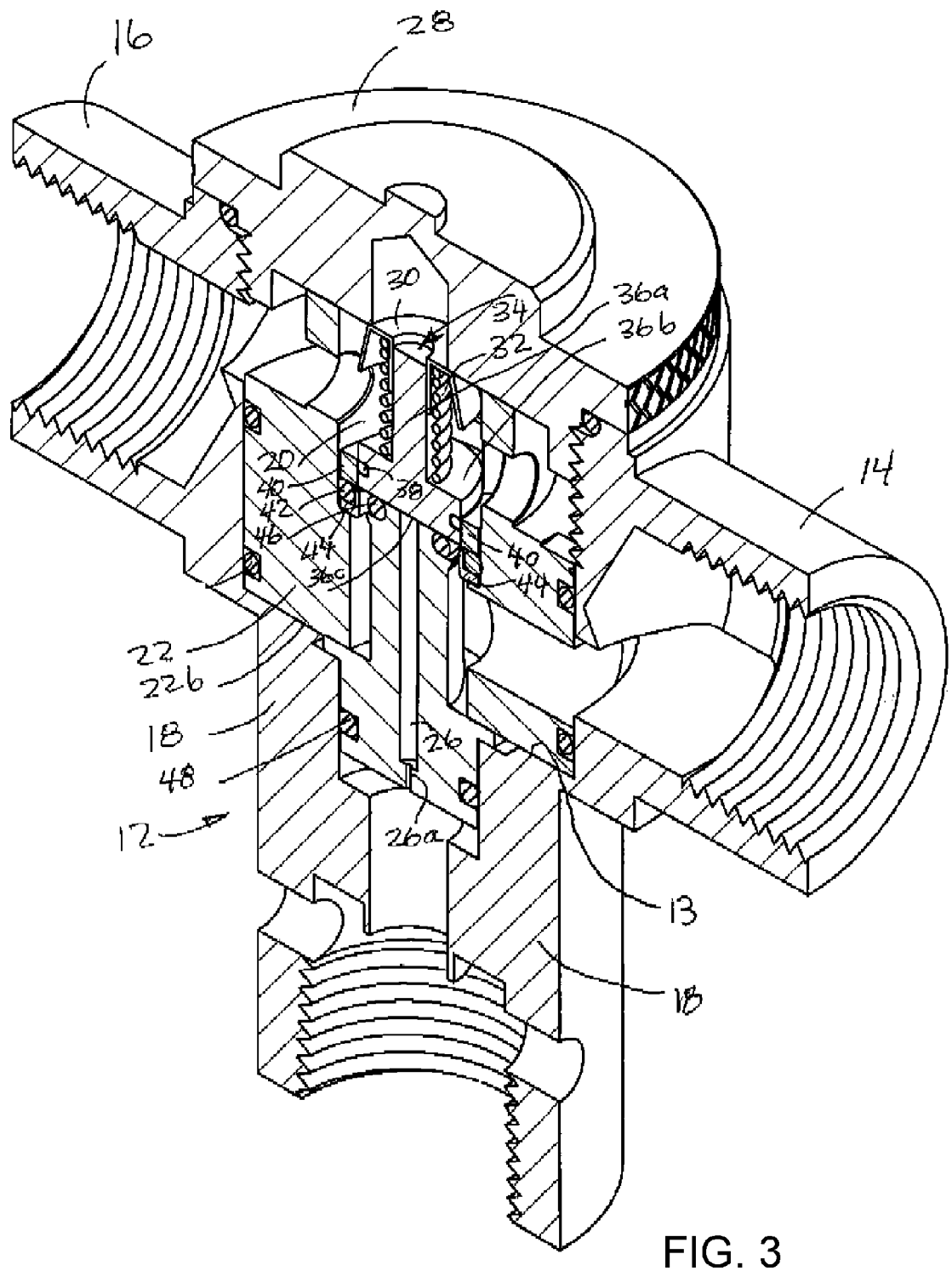
FIG. 3 is an enlarged view of the trap primer valve, shown in perspective.

The check valve adapter also includes radially disposed, spaced apart ports 22c, and spaced-apart O-ring grooves 23 each receive an O-ring 25 (see FIGS. 1 and 3). An O-ring 46 is mounted on trap seat 24 by encircling upper portion 24a and seats against annular surface 24b of the trap seat, as can be seen in FIGS. 1 and 2. Finally it will be noted that another O-ring, indicated at 48 is provided in annular groove 25 of the lower portion of the trap seat, for sealing against the inner bore of the housing, again as shown in FIGS. 1 and 3.

Operation of the Trap Primer Assembly

Operation of the assembly as above described, directed to a flow-through trap primer assembly incorporating a flow regulator which utilizes a check valve operable for metering water to the trap of a system will now be explained. The sequence of how the invention operates can be first appreciated by viewing FIG. 1, where the trap primer valve assembly is in its static, non-operating condition where no faucet in the building has been actuated to permit any significant flow, meaning that there is insufficient flow from the main through the inlet indicated at 14 for direction to outlet 16 to raise piston 34 from its seated position.

In this state, the check valve is oriented so that bottom surface 36c of piston 34 engages and is urged against top surface 24a of the trap seat by action of spring 36, to thereby seal the system. Because there is no call for water from a faucet or other demand in the building sufficient to override the downward force of spring 32, the spring force is sufficient to maintain a seal.

Figure 4:
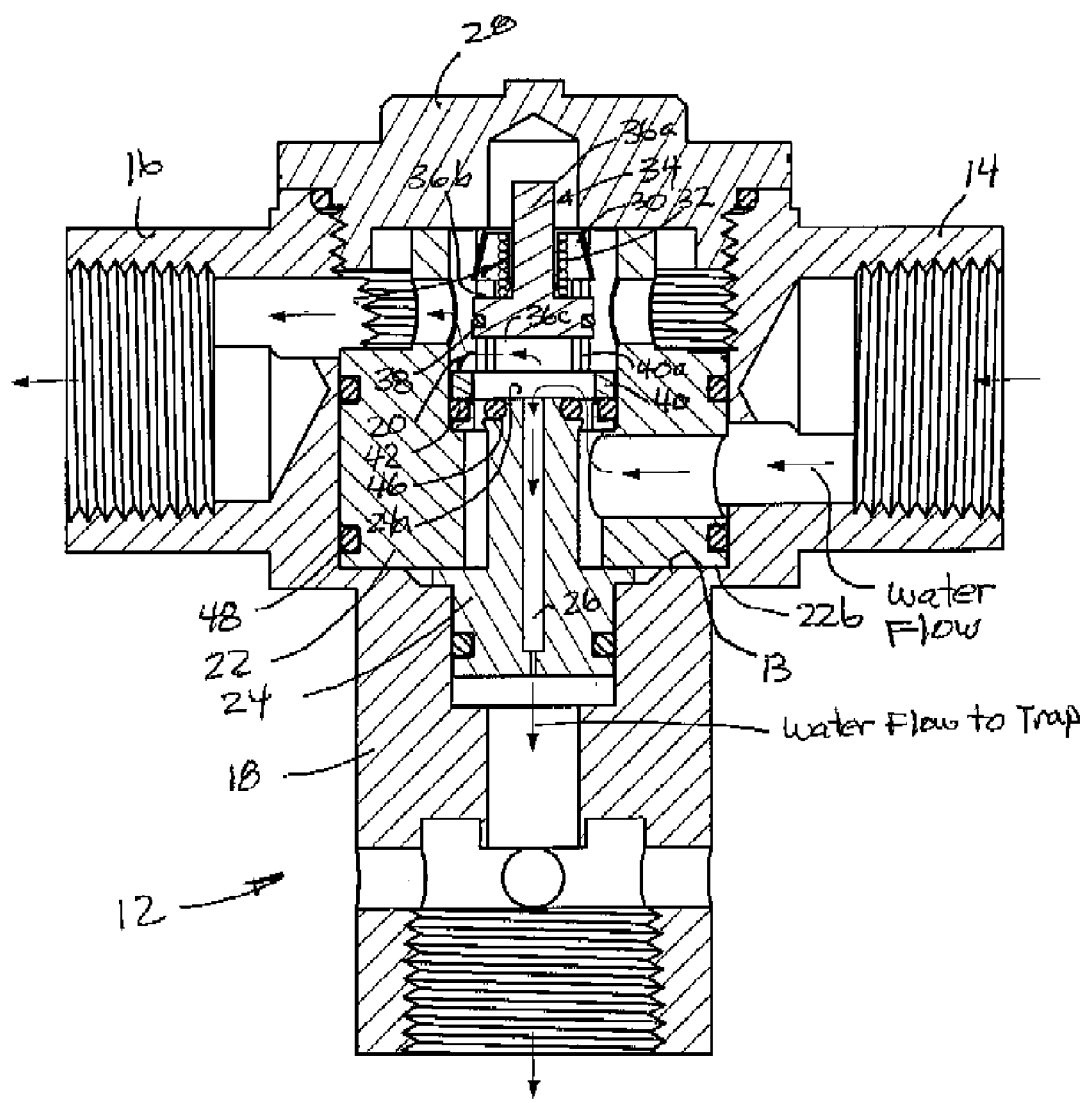
FIG. 4 is a cross-sectional view, similar to that shown in FIG. 1 illustrating water flow lines and how the flow of water from a source or main (not shown) is directed to lift the piston of the check valve upwardly, thereby opening the inlet to the jet to permit water to flow thereinto, with water also being directed through the cartridge to the outlet that leads to a faucet which has been opened.

If, however, as shown in FIG. 4, demand for water is called for by turning on a faucet in the delivery system (not shown), water flow will begin, as shown by the flow lines, from inlet 14. Once demand for water establishes a certain flow rate, the water will exert sufficient force against bottom surface 36c of piston 34 to raise it upwardly to overcome the downward exerting force of spring 32. The piston will rise upwardly, the extent depending on the flow rate, thereby opening the check valve.

The piston head will slide upwardly, with its sides initially sliding along the inner annular surface of rim 40, and then further upwardly guided by and along the insides of projecting elements 40a. As the piston rises, it enables the majority of the water flow to pass upwardly through an annular region extant between the inner annular region between base 44 and O-ring 46, as shown, then through the opening in rim 40 and the openings between elements 40a for delivery downstream to outlet 16, as shown by the flow lines. Water will also concurrently be metered to bore 26 and jet 26a, for delivery to the trap of the sewer.

It can be seen that with the arrangement of the present invention, the check valve permits relatively low flow rates to open the valve so that water may be metered to the trap of an outlet or sewer line. Flow regulation can be selectively achieved, and water savings realized by adjusting the check valve to permit a desired amount of water to be directed to replenish the amount desired to be maintained in the trap.

We claim:

1. A flow meter trap primer valve assembly for regulating water flow comprising:
    an inlet for receiving water from a supply;
    a check valve mounted within an adaptor having an elongate bore forming a jet;
    the check valve including a piston mounted within a cartridge which includes an annular rim having an interior annular surface wherein a plurality of spaced-apart upright elements project from the annular rim; and
    a biasing element for normally urging the piston against a trap seat.

2. The flow meter trap primer valve assembly of claim 1 wherein the piston is dimensioned for sliding along the annular interior surface of the annular rim when water from the supply is introduced into the inlet.

3. The flow meter trap primer valve assembly of claim 2 wherein the piston may slide upwardly along the interior annular surface of the annular rim to permit water from the supply to be directed to the jet.

4. The flow meter trap primer valve assembly of claim 3 wherein the piston and the jet are aligned along a common axis.

* * * * *